United States Patent
Braunschweiger et al.

(10) Patent No.: US 8,162,362 B2
(45) Date of Patent: Apr. 24, 2012

(54) GRIPPER SYSTEM FOR STACKED UNIT LOADS

(75) Inventors: Nils Braunschweiger, Weyhe (DE); Eckhard Wellbrock, Bremen (DE); Hermann Franck, Ritterhude (DE); Wolfgang Echelmeyer, Osterholz-Scharmbeck (DE); Kolja Schmidt, Bremen (DE)

(73) Assignee: Duetsche Post AG, Bonn (DE)

( * ) Notice: Subject to any disclaimer, the term of this patent is extended or adjusted under 35 U.S.C. 154(b) by 577 days.

(21) Appl. No.: 12/300,176

(22) PCT Filed: Mar. 16, 2007

(86) PCT No.: PCT/DE2007/000481
§ 371 (c)(1),
(2), (4) Date: Apr. 7, 2009

(87) PCT Pub. No.: WO2007/131464
PCT Pub. Date: Nov. 22, 2007

(65) Prior Publication Data
US 2010/0032972 A1    Feb. 11, 2010

(30) Foreign Application Priority Data
May 11, 2006   (DE) .......................... 10 2006 022 278

(51) Int. Cl.
*B66C 1/02*    (2006.01)
(52) U.S. Cl. ........... 294/65; 294/188; 414/627; 414/797
(58) Field of Classification Search ................ 294/2, 65, 294/86.4, 188; 414/627, 737, 797; 493/315–317; 901/40
See application file for complete search history.

(56) References Cited

U.S. PATENT DOCUMENTS
3,115,262 A    12/1963   Avery
(Continued)

FOREIGN PATENT DOCUMENTS
DE    FR2617078    12/1988
(Continued)

OTHER PUBLICATIONS

International Preliminary Report on Patentability for International Application No. PCT/DE2007/000481 (English Translation).

*Primary Examiner* — Dean Kramer
(74) *Attorney, Agent, or Firm* — International IP Law Group, PLLC

(57) ABSTRACT

There is provided a gripper system for stacked packaged goods. An exemplary gripper system comprises a first gripper unit for gripping a package by a front surface of the package. The exemplary gripper system further comprises a second gripper unit for gripping the package by a second surface that is at a right angle to the front surface, the second gripper unit having a drive device associated therewith, the second gripper unit being adapted to be moved out of a starting position in which the second gripper unit and the drive device as seen from the gripping side of the first gripper unit, are arranged behind the first gripper unit, into a gripping position in which the first gripper unit is positioned for gripping the package by its front surface and the second gripper unit is positioned for gripping the package by its second surface. In a gripper system according to an exemplary embodiment of the present invention, outer dimensions of the gripper system, as seen from the gripping side of the first gripper unit, do not exceed dimensions of a front surface of a smallest package to be gripped.

19 Claims, 15 Drawing Sheets

U.S. PATENT DOCUMENTS

| | | | |
|---|---|---|---|
| 3,820,667 A * | 6/1974 | Critchlow et al. | 414/627 |
| 4,789,295 A | 12/1988 | Boucher | |
| 4,828,304 A * | 5/1989 | No et al. | 294/2 |
| 5,232,332 A | 8/1993 | Focke | |
| 5,564,893 A * | 10/1996 | Tacchi et al. | 414/796.9 |
| 5,664,617 A * | 9/1997 | Patton et al. | 164/269 |
| 5,752,729 A * | 5/1998 | Crozier et al. | 294/2 |
| 5,984,623 A | 11/1999 | Smith | |
| 7,017,961 B1 * | 3/2006 | Parnell et al. | 294/2 |
| 7,044,706 B2 * | 5/2006 | Jung | 414/737 |
| 2001/0052708 A1 | 12/2001 | Schmalz | |
| 2003/0123962 A1 | 7/2003 | Mikulic | |

FOREIGN PATENT DOCUMENTS

| | | |
|---|---|---|
| DE | 4328155 | 2/1995 |
| DE | 19959285 | 6/2001 |
| EP | 1321397 | 6/2003 |
| EP | 1524216 | 4/2005 |

* cited by examiner

GRIPPER SYSTEM FOR STACKED UNIT LOADS

CROSS REFERENCE TO RELATED APPLICATIONS

Pursuant to 35 U.S.C. §371, this application is the United States National Stage Application of International Patent Application No. PCT/DE2007/000481, filed on Mar. 16, 2007, the contents of which are incorporated by reference as if set forth in their entirety herein, which claims priority to German (DE) Patent Application No. 10 2006 022 278.4, filed May 11, 2006, the contents of which are incorporated by reference as if set forth in their entirety herein.

BACKGROUND

A gripper system is known from European patent application EP 1 524 216 A1. It has the drawback that, for example, packages that are somewhat recessed in a wall of packages and that cannot be reached from above cannot be gripped since the gripper system cannot be moved close enough to the front surface of the package.

An improved gripper system is desired.

SUMMARY OF THE INVENTION

An exemplary embodiment of the present invention relates to a gripper system for stacked packaged goods. Such an exemplary embodiment may comprise a first gripper unit for gripping a package by its front surface, a second gripper unit for gripping a package by a second surface that is at a right angle to its front surface, and a drive device for the second gripper unit.

According to an exemplary embodiment of the present invention, this objective is achieved with the gripper system in that the second gripper unit can be moved out of a starting or resting position—in which the second gripper unit and the drive device, as seen from the gripping side of the first gripper unit, are arranged behind the first gripper unit, and the outer dimensions of the gripper system, as seen from the gripping side of the first gripper unit, do not exceed the dimensions of the front surface of the smallest package that is expected to be gripped—into a gripping position in which the first gripper unit is positioned for gripping the package by its front surface and the second gripper unit is positioned for gripping the package by its second surface.

According to an exemplary embodiment of the present invention, it can be provided that the second gripper unit and the drive device, as seen from the gripping side of the first gripper unit, are dimensioned and arranged behind the first gripper unit in such a way that they do not protrude laterally beyond the first gripper unit.

The gripper system can be provided, for example, for a robot used for gripping packages. Since the first and the second gripper units are arranged at a right angle with respect to each other, such gripper systems may also be referred to as angle grippers.

According to an exemplary embodiment of the present invention, it can be provided that at least one of the first and second gripper units is a suction gripper, a magnet gripper, a needle gripper, an electrostatic gripper or an adhesion gripper. This list, however, is not exhaustive since other grippers that have an equivalent effect can also be used.

In particular, it can be provided that a suction gripper according to an exemplary embodiment of the present invention is a suction cup gripper, a flat suction gripper, a bellows suction gripper or a surface suction gripper. Of course, a suction cup gripper, for example, can have several suction cups. The term surface suction gripper is meant to refer to a surface suction element or a suction mat of the type manufactured, for example, by the Unigripper Company.

Advantageously, the second surface is the bottom or top surface of a package. The top surface can make sense, for example, if a package is to be taken out of the top row of a wall of packages and if there is still space available above the top row. Of course, it is also conceivable for the gripper system to be configured rotatably so that, depending on the conditions of use, the bottom or the top surface of a package can be gripped.

Furthermore, it can be provided that, in the starting or resting position, the second gripper unit is arranged at a right angle to the first gripper unit.

Advantageously, a sensor unit is provided that can be connected to a control means for a handling device, especially a robot, and to the drive device, said sensor unit comprising a scanner and/or a CCD camera for determining the distance and/or the position of the package to be gripped and/or a contact point on the front surface of the package to be gripped and for positioning the package to be gripped. Of course, it is also possible that another control means is provided for this purpose. The word "distance" refers to the distance between the gripper system and the package, for example, the front surface of the package.

According to a special embodiment of the invention, it can be provided that the gripper system can be controlled by means of a control means in such a way that first of all, the first gripper unit grips the front surface of the package and then the second gripper unit grips the second surface of the package. Here, the first gripper unit can be used to at least partially pull the package out of a wall of packages before the second gripper unit partially or completely grips the second surface of the package.

According to another exemplary embodiment of the present invention, it can be provided that the drive device comprises a swiveling or rotating device for swiveling or rotating the second gripper unit out of the starting or resting position into the gripping position.

Advantageously, the second gripper unit can be swiveled or rotated about a horizontal or vertical axis using the swiveling or rotating device. In one exemplary embodiment, the horizontal or vertical axis is outside of the second gripper unit.

According to another exemplary embodiment of the invention, it can be provided that the drive device comprises a parallel displacement device for displacing the second gripper unit in parallel out of the starting or resting position into the gripping position.

Advantageously, the parallel displacement device may comprise two hinged column pairs that can each be driven by means of a pneumatic cylinder.

On the other hand, it can also be provided that the parallel displacement device comprises an elliptical guide and a linear drive.

According to another alternative embodiment of the present invention, the drive device comprises a folding device for folding the second gripper unit out of the starting or resting position into the gripping position.

Advantageously, the second gripper unit can be folded about a horizontal or vertical axis by means of the folding device.

According to another exemplary embodiment of the present invention, a drive device is provided for the first gripper unit and the first and second gripper units can be moved out of a starting or resting position—in which the second gripper unit and the drive devices for the first and second gripper units, as seen from the gripping side of the first gripper unit, are arranged behind the first gripper unit in such a way that they do not protrude beyond the first gripper position—into a gripping position in which the first gripper unit is positioned for gripping the package by the front surfaces and the second gripper unit is positioned for gripping the package by its second surface.

Advantageously, the first gripper unit may be a first surface suction gripper, the second gripper unit may be a second surface suction gripper, the drive device for the first gripper unit may comprise a first linear drive for horizontally moving the first surface suction gripper in the effective direction of the suction force of the first surface suction gripper and it may comprise a second linear drive for vertically moving the first linear drive, and the drive device for the second gripper unit may comprise a third linear drive for horizontally moving the second surface suction gripper in the effective direction of the suction force of the first surface suction gripper, whereby the first or third linear drives may be arranged in a vertical plane above or below each other.

In particular, it can be provided that at least one of the first, second or third linear drives comprises a guided cylinder.

As an alternative, it is conceivable that at least one of the first, second or third linear drives comprises a linear drive without a piston rod.

Finally, at least one of the first, second or third linear drives can be operated pneumatically.

An exemplary embodiment of the present invention may be based on a realization that, through the design and arrangement of the second gripper unit and of the drive device for the second gripper unit relative to the first gripper unit, it is possible for packages to the gripped and pulled out, even when they are in hard-to-reach positions.

BRIEF DESCRIPTION OF THE DRAWINGS

Additional features and advantages of an exemplary embodiment of the present invention can be gleaned from the claims and from the description below, in which two embodiments are explained in detail with reference to the schematic drawings, in which the following is shown:

DETAILED DESCRIPTION OF SPECIFIC EMBODIMENTS

Figure 1:
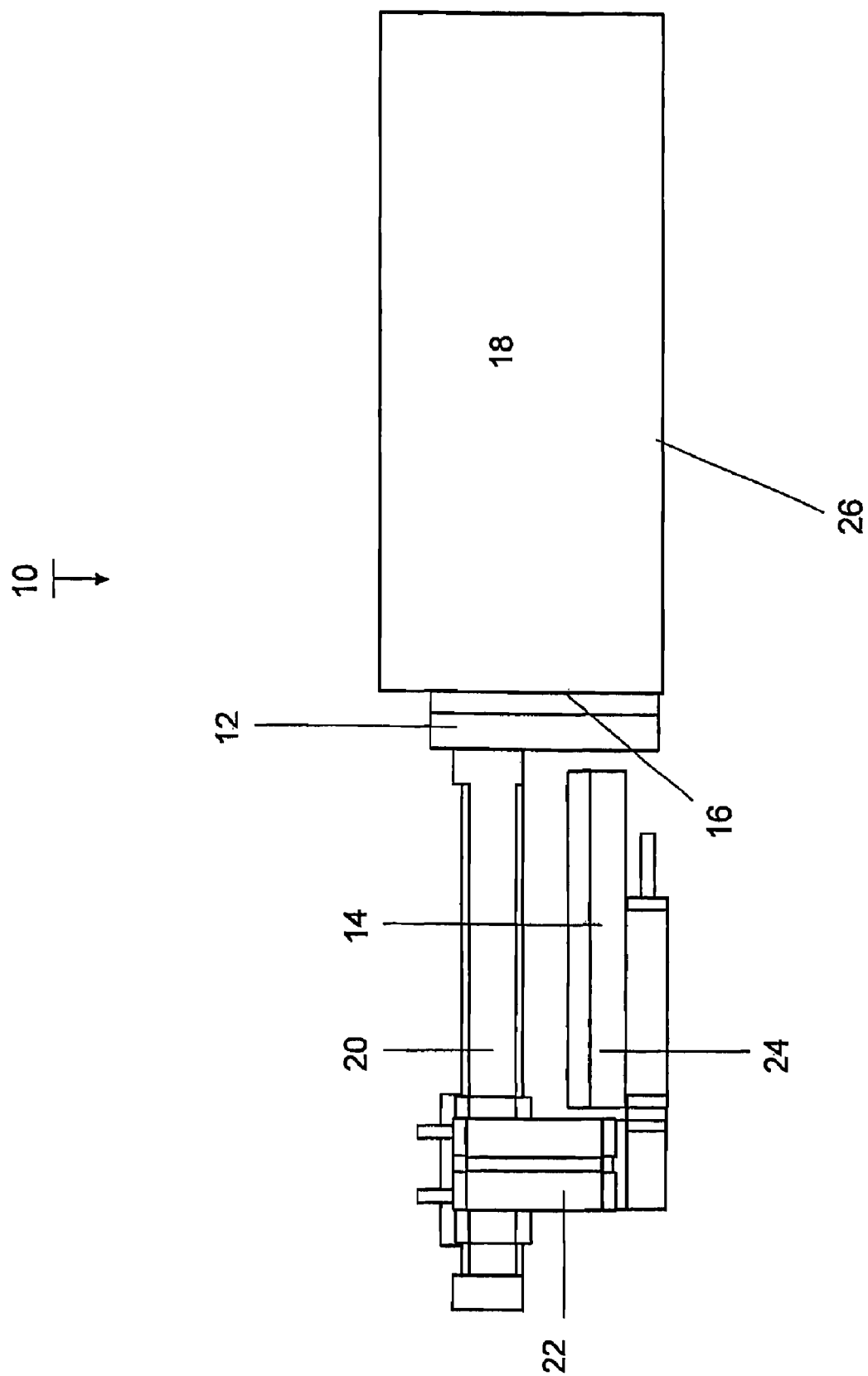
FIG. 1 is a side view of a gripper system according to a exemplary embodiment of the present invention in use during a first phase.

The gripper system 10 shown in FIGS. 1 to 5 comprises a first surface suction gripper 12 and a second surface suction gripper 14. The first surface suction gripper 12 has a vertically extending surface for applying suction to the front surface 16 of a cube-shaped package 18. The package 18 is in a wall of packages (not shown here). The second surface suction gripper 14 has a horizontally extending surface.

The first surface suction gripper 12 is attached to the front end—that is to say, facing the package 18—of a first linear drive 20 in order to horizontally move the first surface suction gripper 12 in the effective direction of the suction force. The first linear drive 20 can, in turn, be vertically moved by means of a guided cylinder 22.

The second surface suction gripper 14 can be moved horizontally in the same direction as the first surface suction gripper 12 by means of a guided cylinder 24 that extends in a vertical plane below the first linear drive 20.

Figure 6:
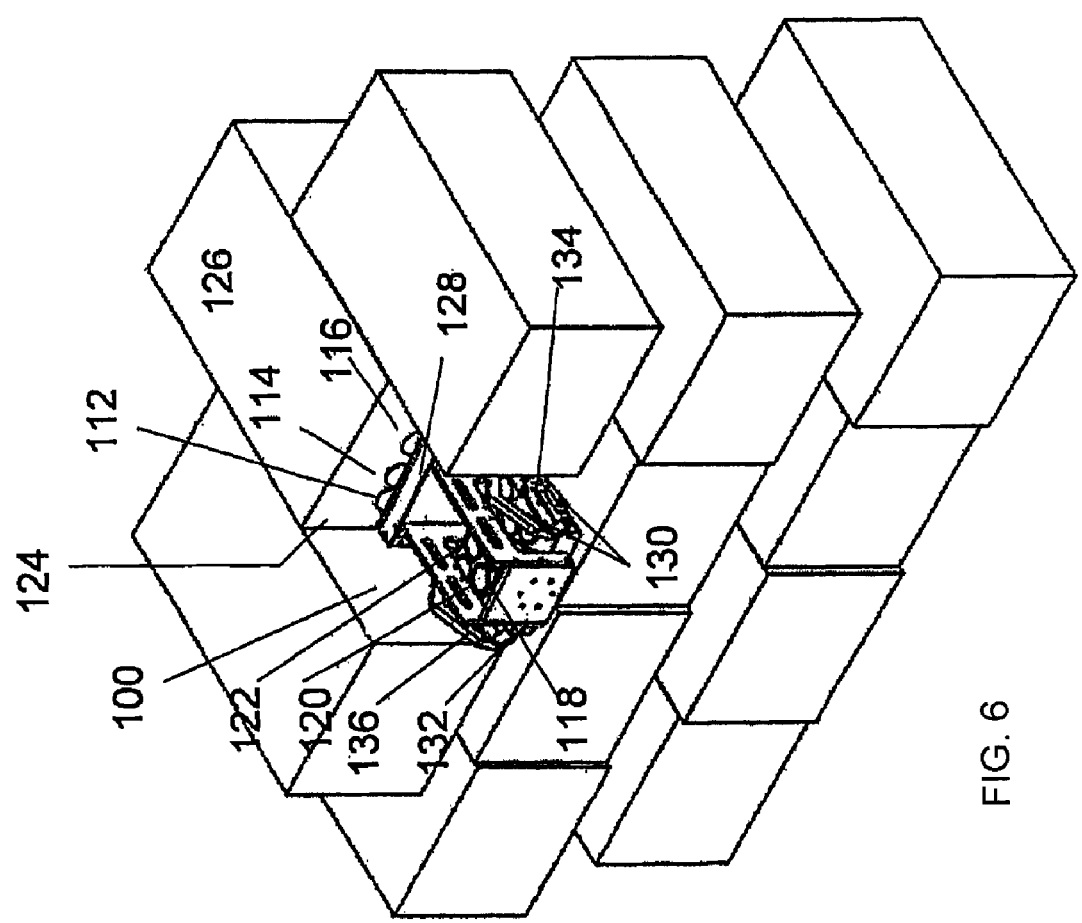
FIG. 6 is a perspective view of a gripper system according to an exemplary embodiment of the present invention in use during a first phase.

In the first phase shown in FIG. 1, the gripper system 10 is in its starting or resting position in which the second surface suction gripper 14, the first linear drive 20, and the guided cylinders 22 and 24 are situated behind the first surface suction gripper 12, that is to say, in FIG. 1, to the left of the first surface suction gripper 12, and they do not protrude laterally beyond the first surface suction gripper 12—as seen from the suction side of the first surface suction gripper 12, that is to say, from the side of the package 18. The dimensions of the surface of the first surface suction gripper 12 are selected so as to be smaller than the dimensions of the front surface 16 of the package 18 so that, if the package 18 is in a package wall, as shown in FIG. 6, it can be pulled out of the wall of packages by means of the gripper system 10.

In FIG. 1, the gripper system 10 has been extended with its first surface suction gripper 12 to the front surface 16 of the package 18 and the first surface suction gripper 12 exerts a suction force onto the front surface 16 of the package 18.

Figure 2:
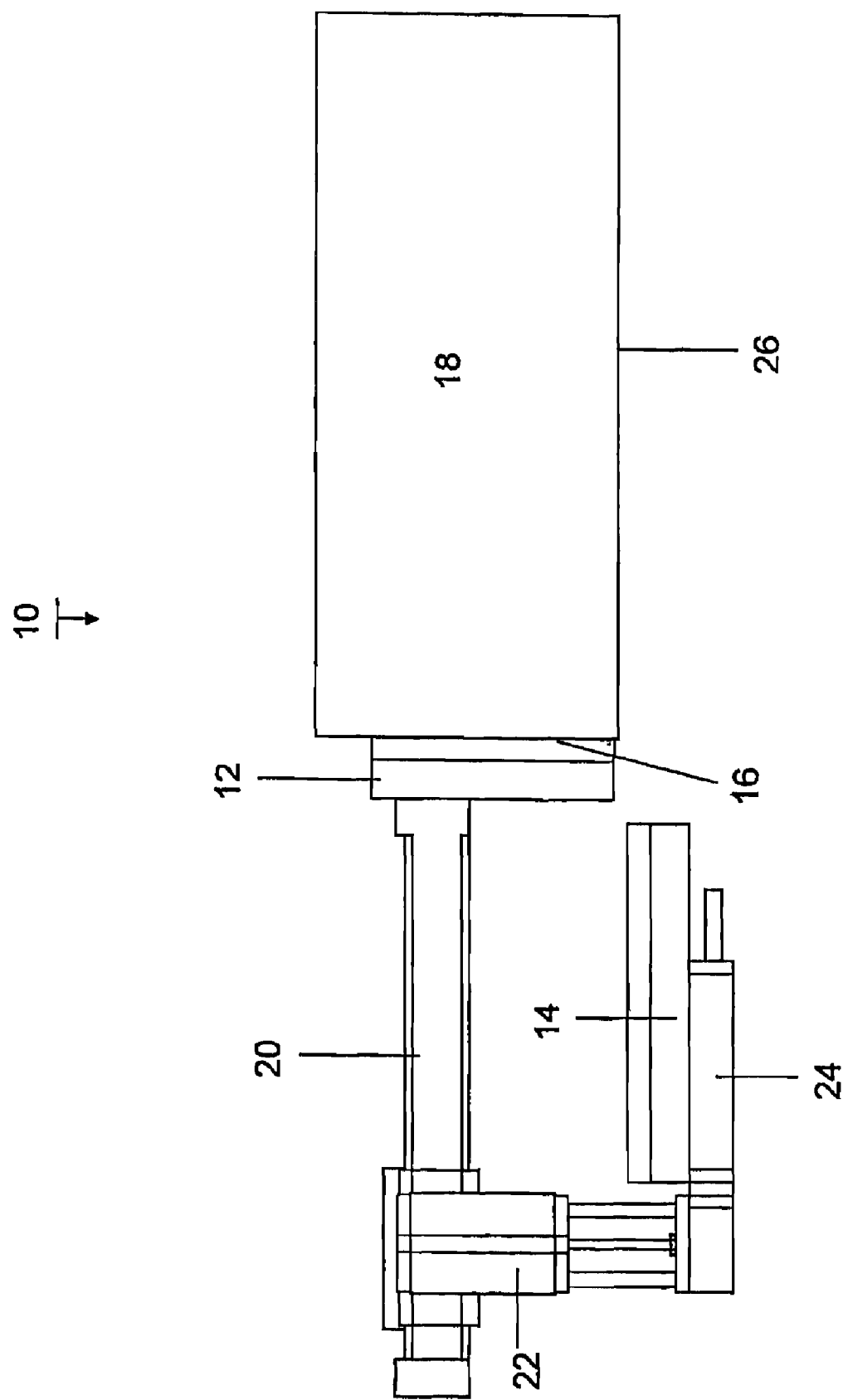
FIG. 2 is a side view of the gripper system of FIG. 1 in use during a second phase.

In FIG. 2, the guided cylinder 22 is already extended slightly downwards in order to bring the second surface suction gripper 14 into position.

Figure 3:
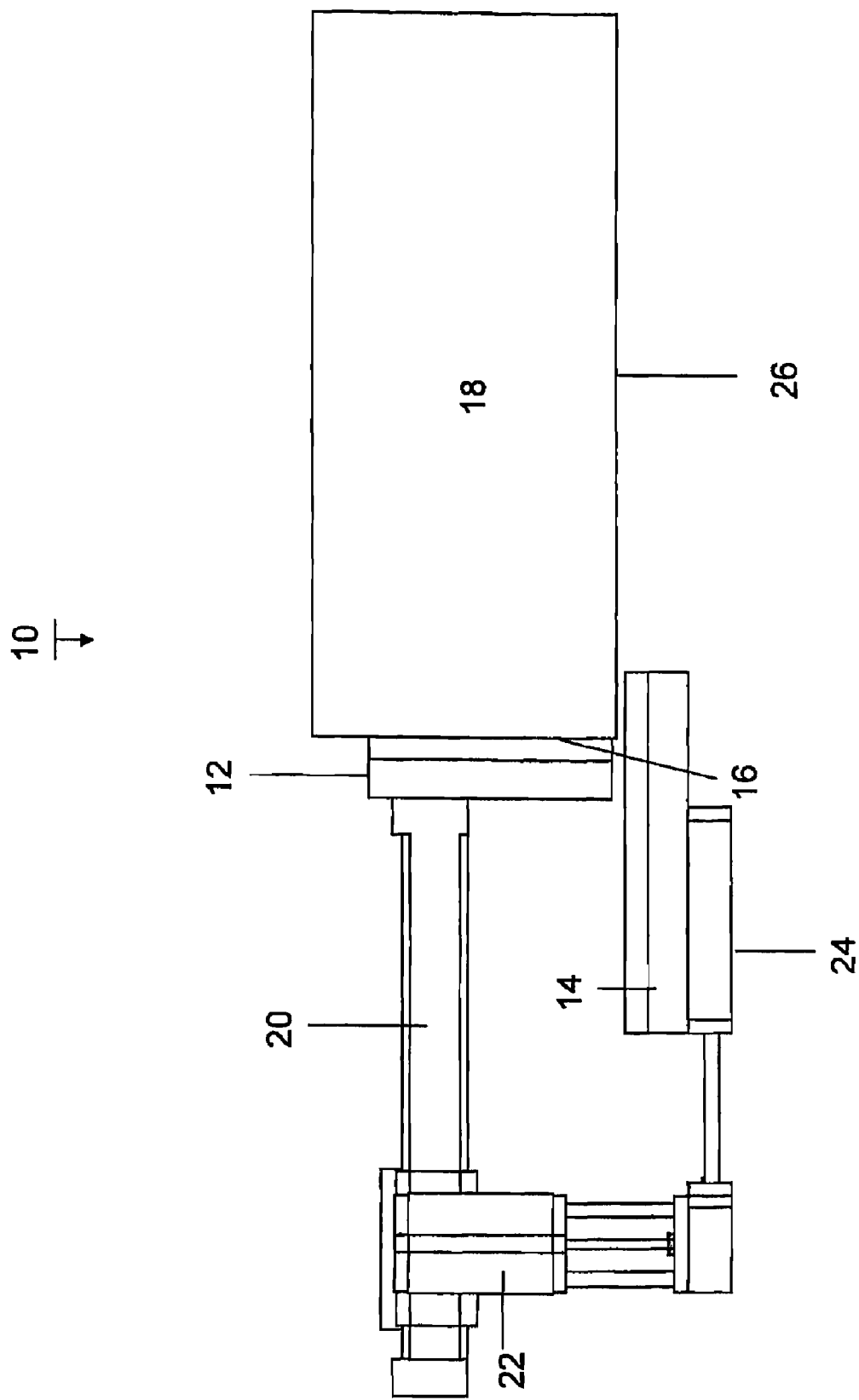
FIG. 3 is a side view of the gripper system of FIG. 1 in use during a third phase.

In FIG. 3, the second surface suction gripper 14 is extended horizontally towards the front. At the same time, the entire gripper system 10 has been moved back, as a result of which the package 18 is partially pulled out of the wall of packages.

Figure 4:
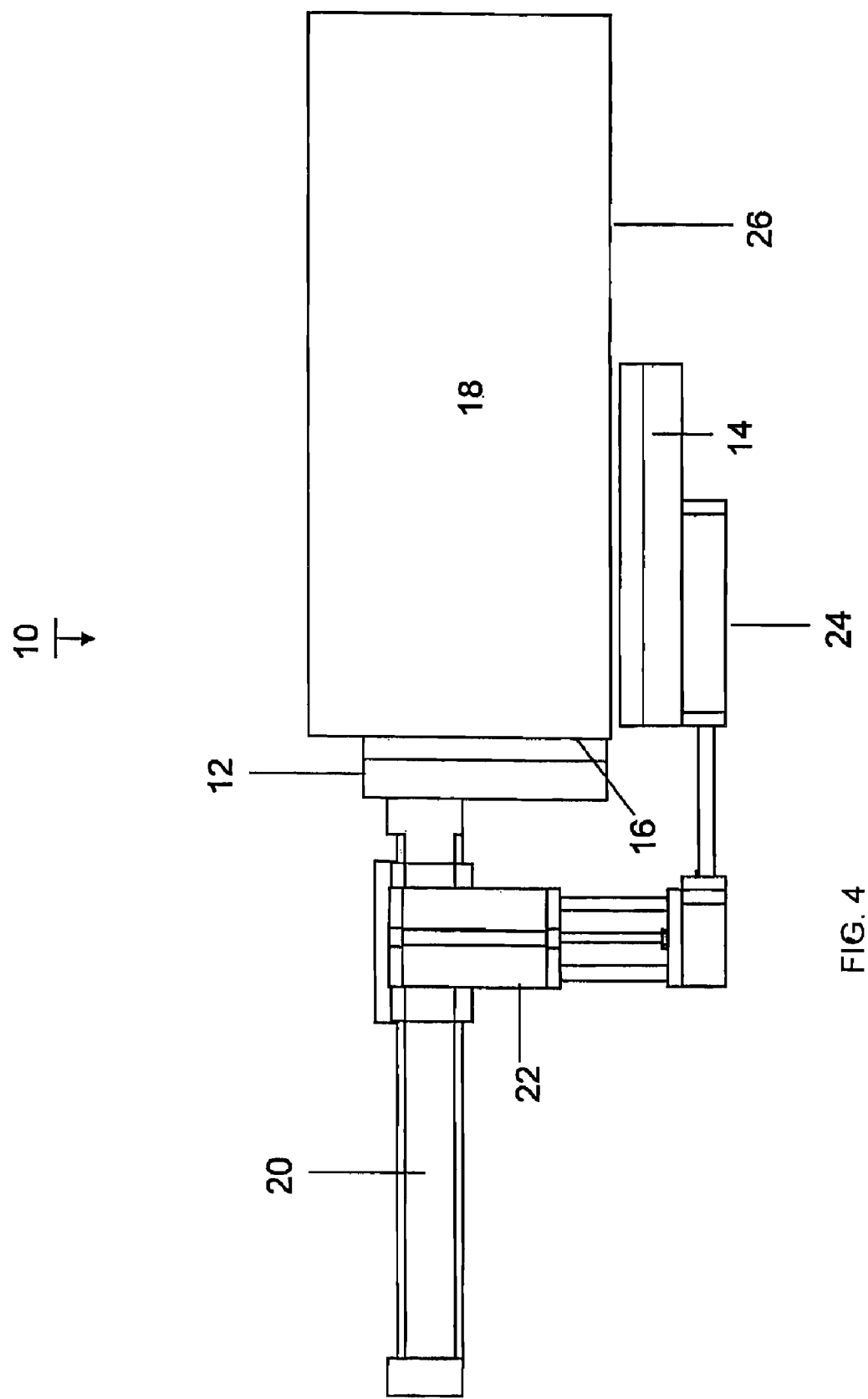
FIG. 4 is a side view of the gripper system of FIG. 1 in use during a fourth phase.

In FIG. 4, the first surface suction gripper 12 has been retracted horizontally by means of the first linear drive 20. As a result, the second surface suction gripper 14 is now in the area of the bottom surface 26 of the package 18. Of course, horizontal movements of the first and second surface suction grippers 12 and 14 can also be executed in the reverse direction, overlapping in a suitable form or simultaneously.

Figure 5:
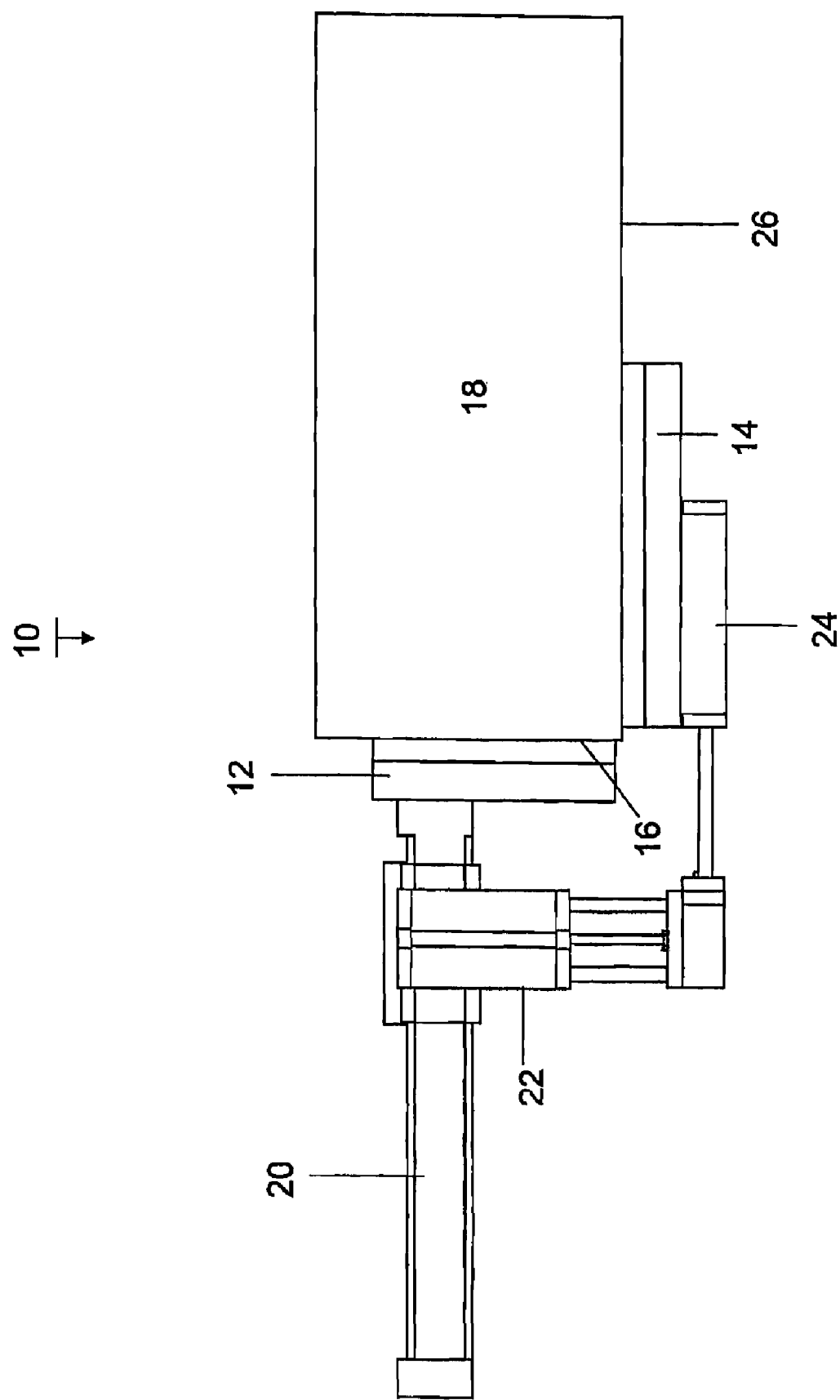
FIG. 5 is a side view of the gripper system of FIG. 1 in use during a fifth phase.

In FIG. 5, the second surface suction gripper 14 is pressed by the guided cylinder 22 against the bottom surface 26 of the package 18, so that a vacuum can build up.

Thanks to the great mobility of the gripper system shown in FIGS. 1 to 4, it can grip an especially wide range of packages of different sizes and different weights. Thanks to the compact dimensions during an empty run, packages can be pulled out of very difficult positions. These include especially the removal of packages from a space that is loaded up to the ceiling.

The movements may be generated by pneumatic parts. These parts are operated at a maximum pressure of 10 bar. The first and second surface suction grippers 12 and 14 secure the package by building up a vacuum between the package and a suction mat. The vacuum is generated using Venturi tubes.

The attachment of the gripper system to a robot flange can be adapted to various requirements.

A laser scanner (not shown here) may be adapted to detect the lower edges of the packages and to steer the robot to a suitable contact point.

Figure 14:
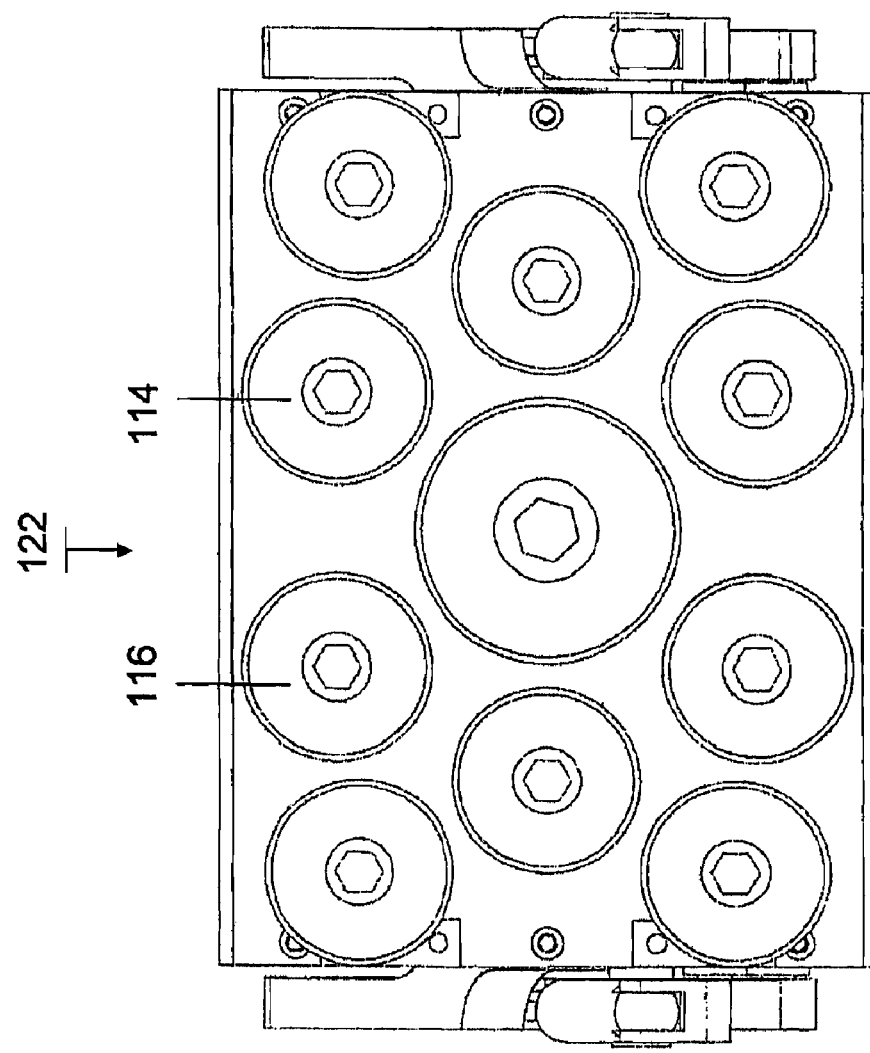
FIG. 14 is a front view of the gripper system shown in FIGS. 6 to 13 in the starting or resting position.
Figure 15:
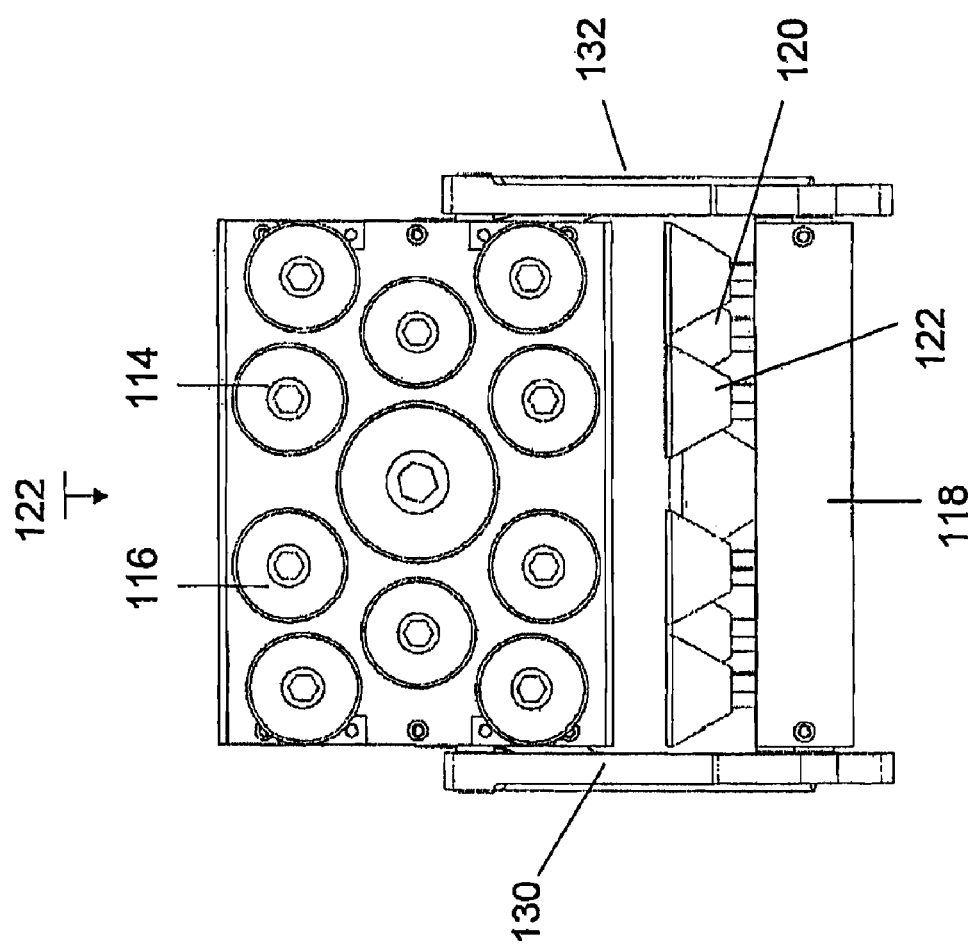
FIG. 15 is a front view of the gripper system shown in FIGS. 6 to 13 in the gripping position.

FIGS. 6 to 13 show another exemplary embodiment of a gripper system according to the present invention, whereby FIGS. 6 to 9 show the gripper system 100 during use in a wall of packages in various phases, and FIGS. 10 to 13 show the same gripper system in the same phases, but without the wall of packages. For the rest, FIGS. 14 and 15 each show a front view of the gripper system in the starting or resting position, and in the gripping position.

As FIGS. 6 to 15 show, the gripper system 100 has a first suction cup gripper 112 with several suction cups of which only two are provided with the reference numerals 114 and 116, said gripper having a surface that extends vertically in the starting or resting position, and it has a second suction cup gripper 118 with several suction cups of which only two are provided with the reference numerals 120 and 122, whose surface extends horizontally in the starting or resting position, whereby the suction cups 120 and 122 face upwards, whereas the suction cups 114 and 116 face forward, that is to say, in the direction of the front 124 of a package 126. The first suction cup gripper 112 is attached to a base 128 on which the second suction cup gripper 118 is also arranged in such a way that it can be displaced in parallel by means of two hinged column pairs 130 or 132. For this purpose, each hinged column pairs 130 or 132 is associated with a pneumatic cylinder 134 or 136. The pneumatic cylinder 134 or 136 as well as the hinged column pairs 130 or 132 are each affixed to the base 128 in an articulated manner. The other ends of the hinged column pairs 130 or 132 are each affixed laterally to the second suction cup gripper 118 in an articulated manner. The other end of each pneumatic cylinder 134 or 136 is affixed to one of the hinged columns of the hinged column pairs 130 and 132 in an articulated manner. In the starting or resting position of the gripper system 100 shown in FIGS. 6 and 10, the gripper system is so compact that—as shown in FIG. 6—a package 126 that is positioned a bit further back than the rest of the packages can also be gripped by its front surface 124 by means of the first suction cup gripper 112. This is achieved in that the hinged column pairs 130 and 132 as well as the pneumatic cylinders 134 and 136 are arranged laterally and the second suction cup gripper 118 is arranged in such a way that, as seen from the suction side of the first suction cup gripper 112, that is to say, from the package 126, these do not protrude laterally beyond the first suction cup gripper 112.

Figure 10:
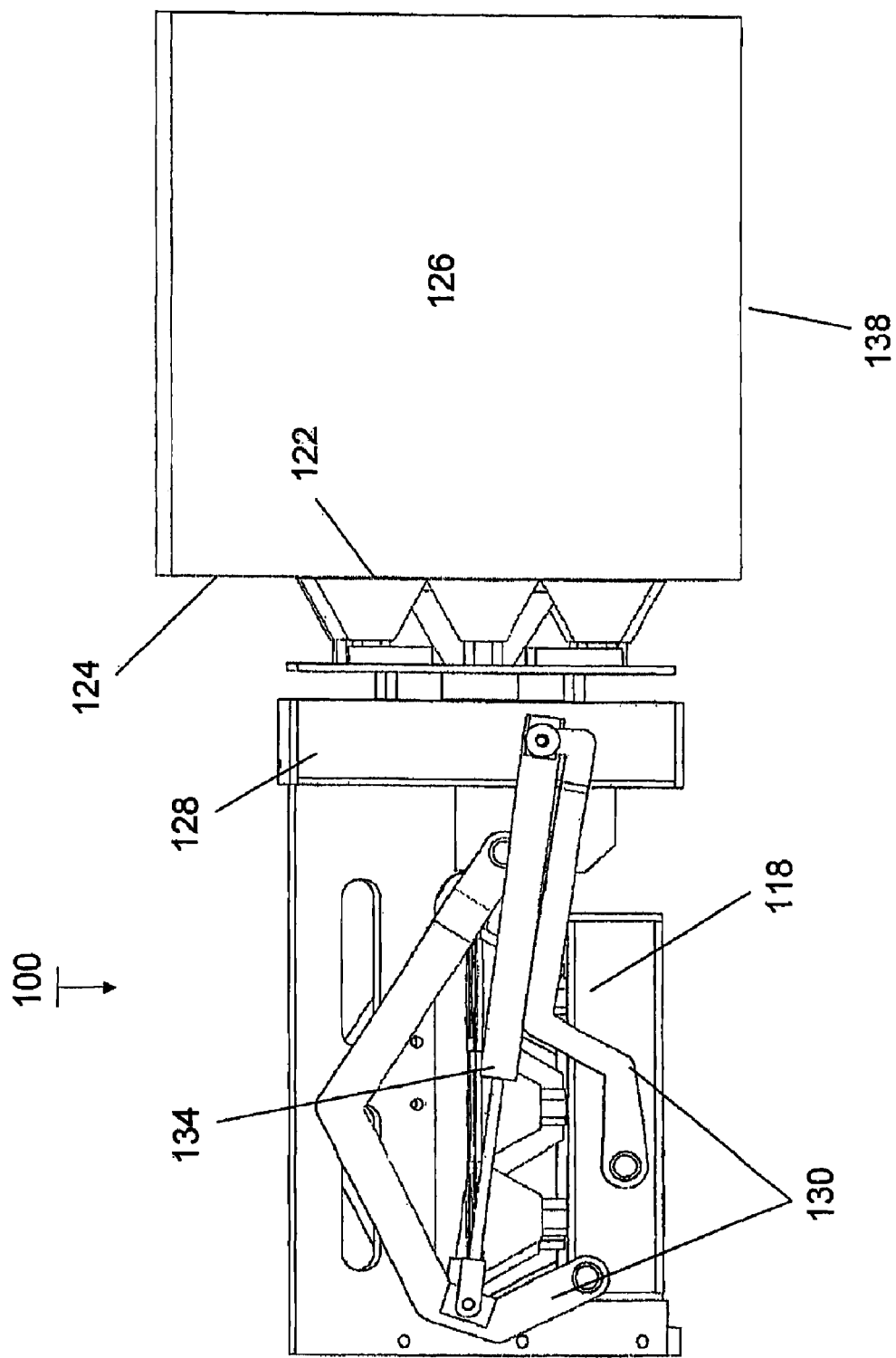
FIG. 10 is a side view of the gripper system of FIG. 6 in the first phase.

In FIG. 6, the first suction cup gripper 112 is used to apply suction to the front surface 124 of the package 126 and to pull it backwards out of the wall of packages (in FIG. 10, towards the left).

Figure 7:
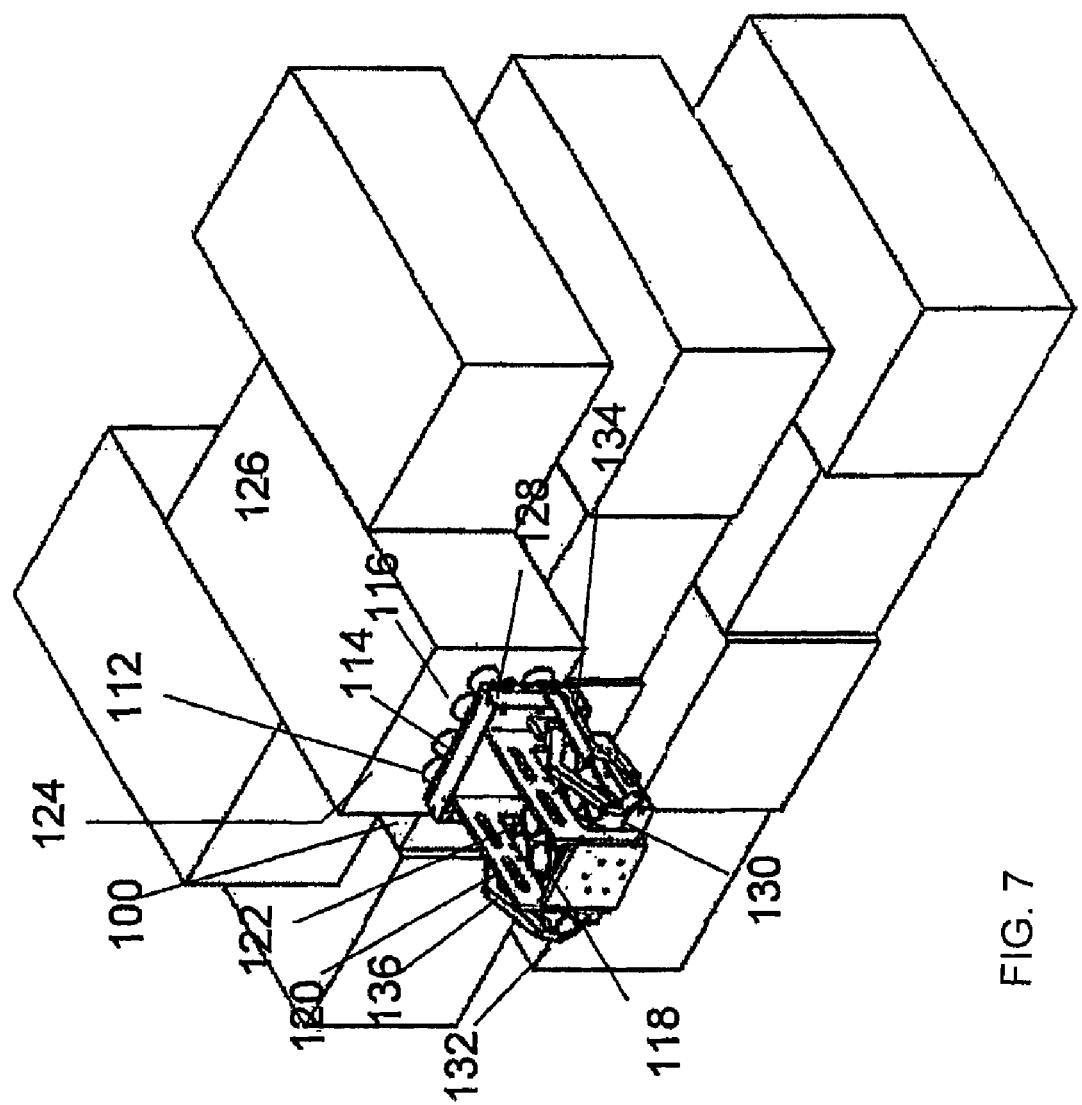
FIG. 7 is a perspective view of the gripper system of FIG. 6 in use during a second phase.
Figure 11:
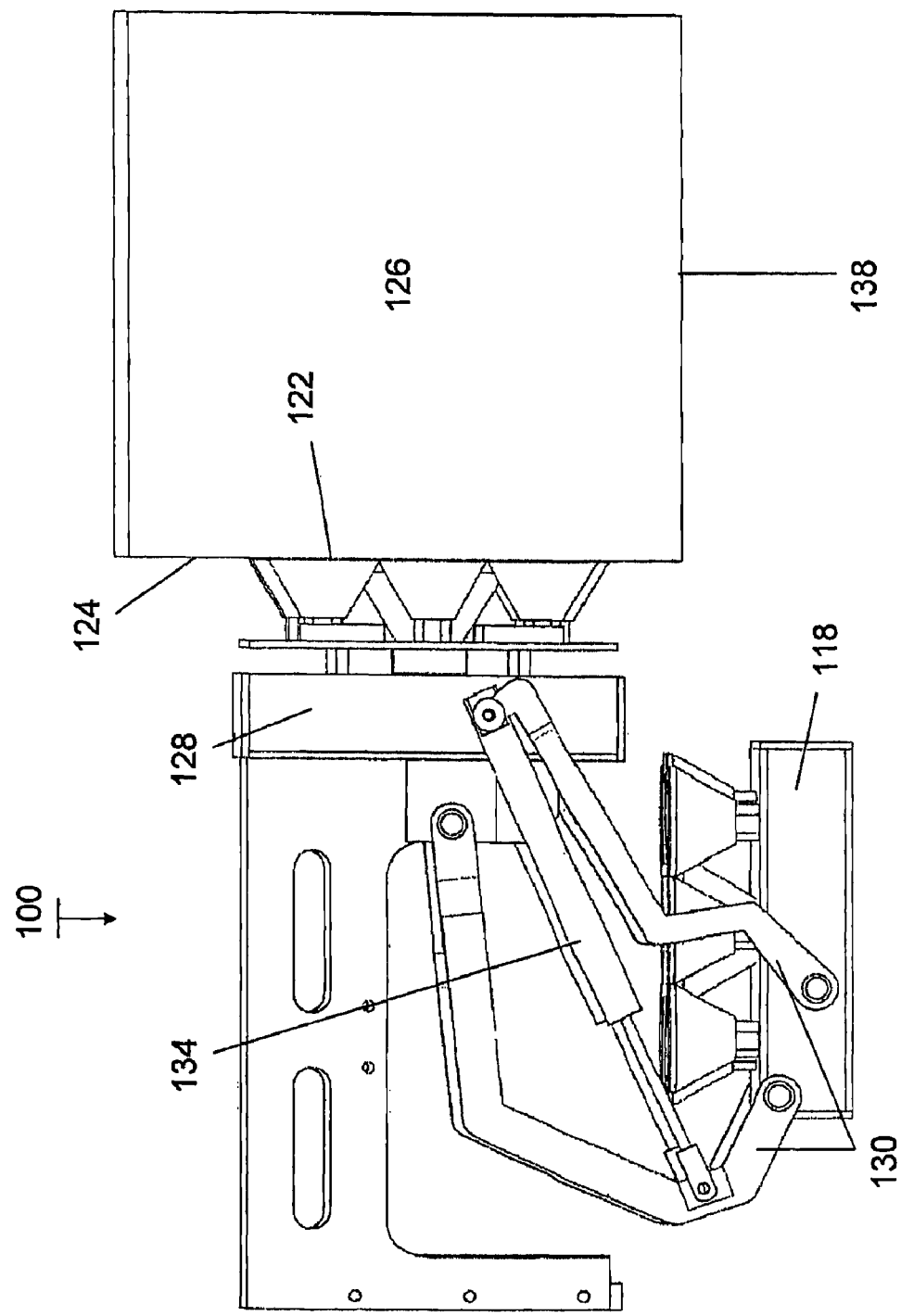
FIG. 11 is a side view of the gripper system of FIG. 7 during use in the second phase.

In FIGS. 7 and 11, the pneumatic cylinders 134 and 136 are already somewhat retracted, so that the second suction cup gripper 118 is already being moved diagonally downwards.

Figure 8:
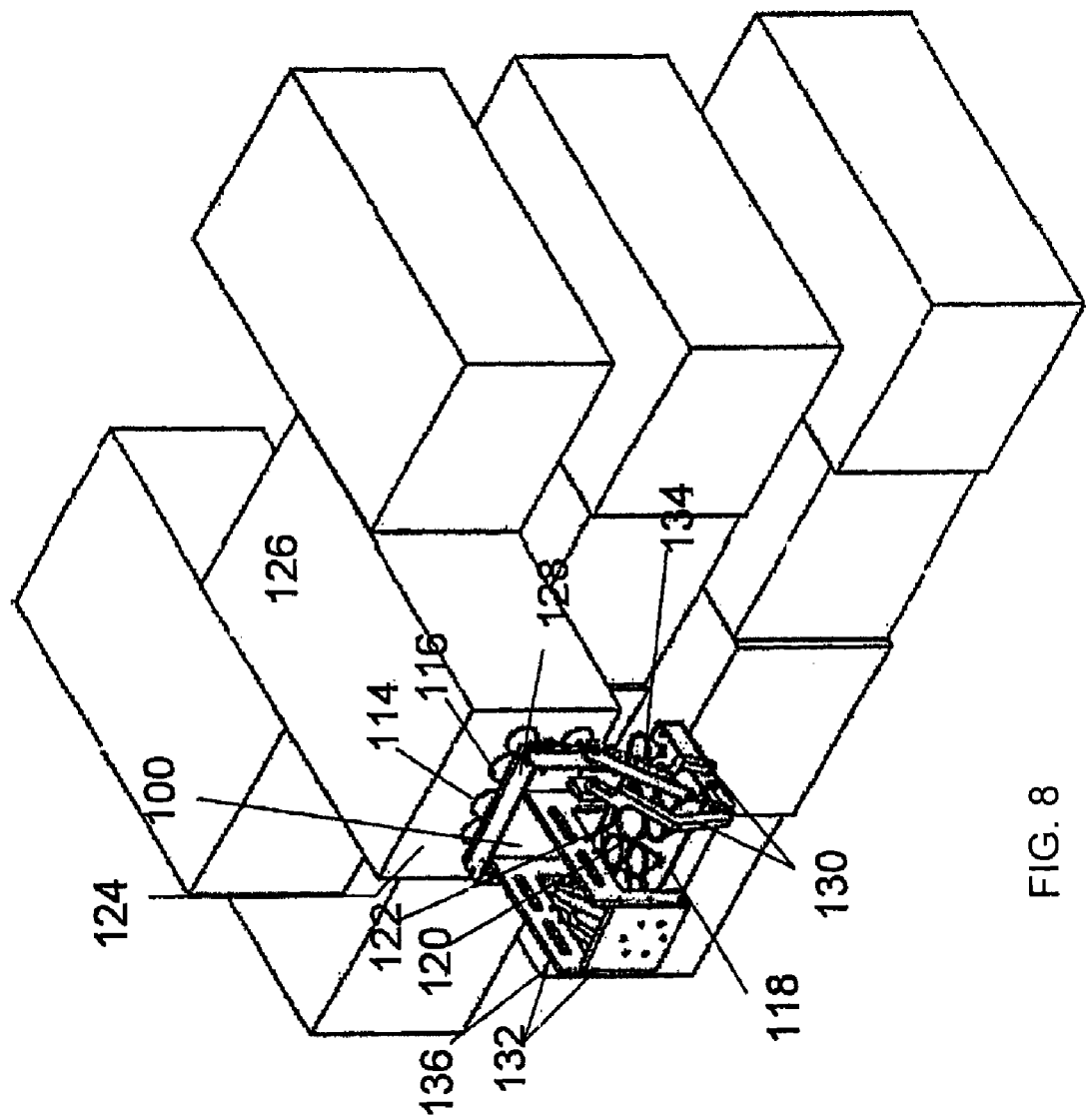
FIG. 8 is a perspective view of the gripper system of FIG. 6 in use during a third phase.
Figure 12:
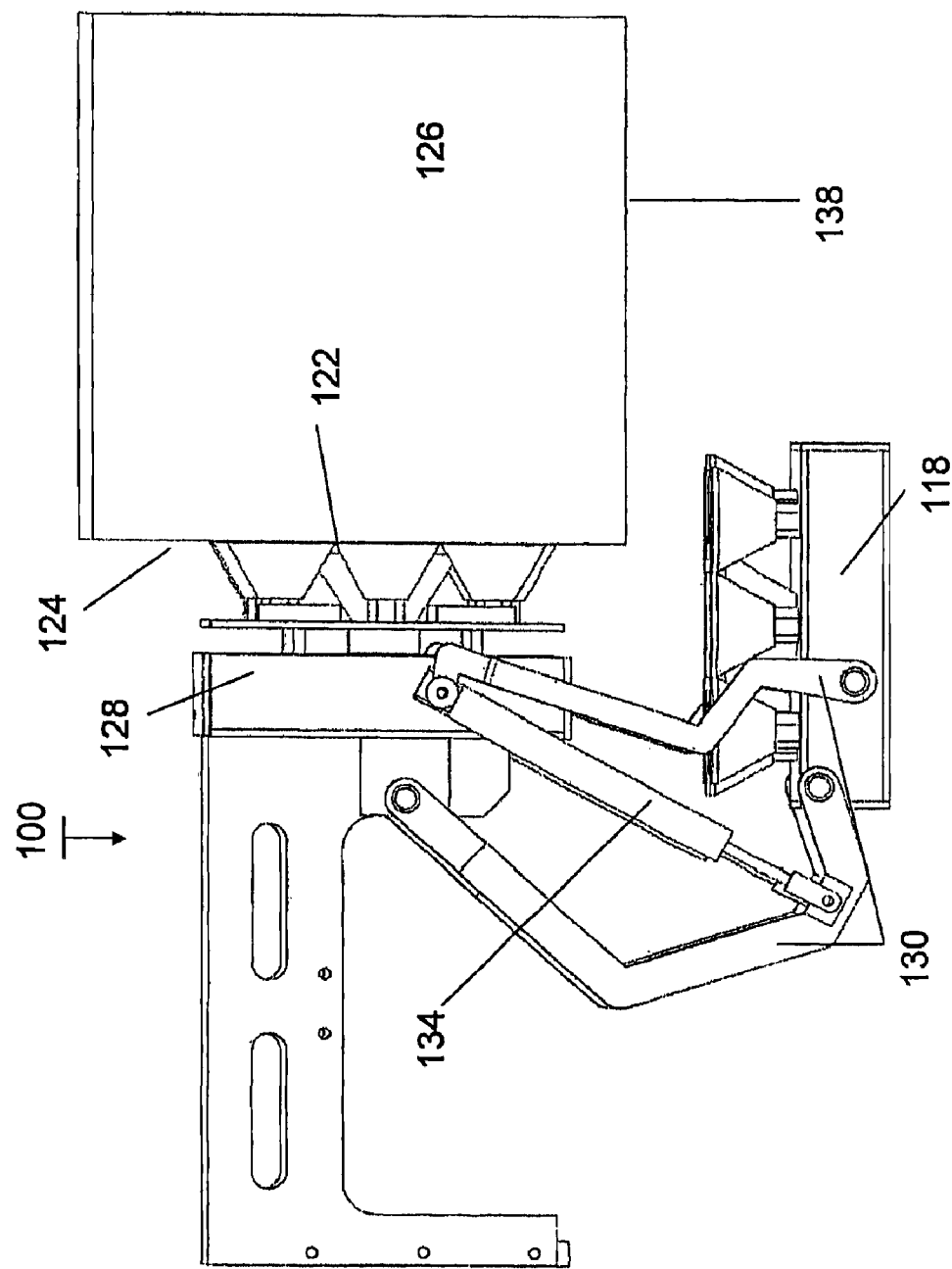
FIG. 12 is a side view of the gripper system of FIG. 8 during use in the third phase.
Figure 13:
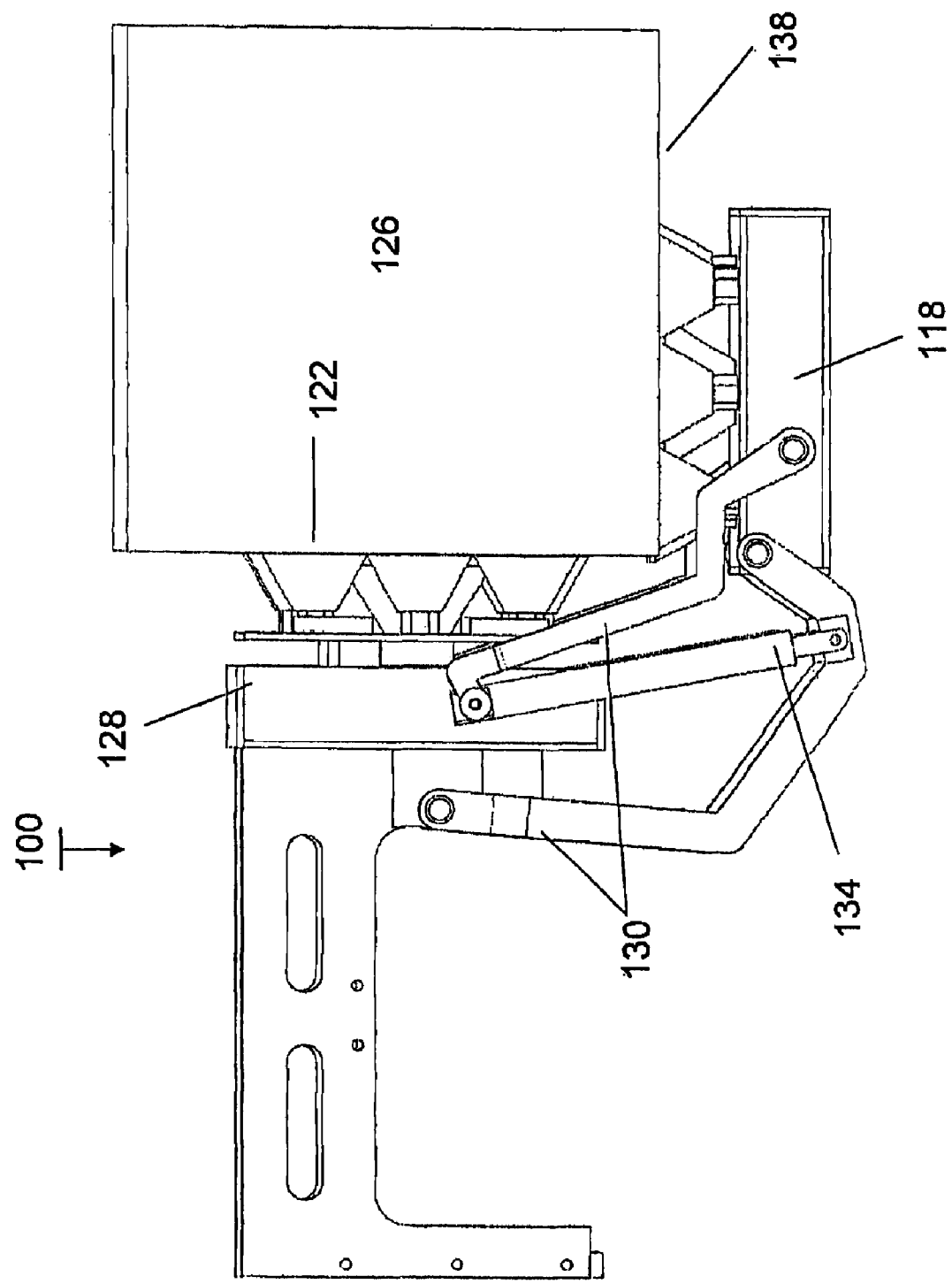
FIG. 13 is a side view of the gripper system of FIG. 9 during use in the fourth phase.

In FIGS. 8 and 12, the pneumatic cylinders 134 and 136 are even further retracted, as a result of which the hinged columns are spread and a parallel displacement is effectuated. The result is that the second suction cup gripper 118 is moved even further in the direction of the package 126 and is moved under its bottom surface 138.

Figure 9:
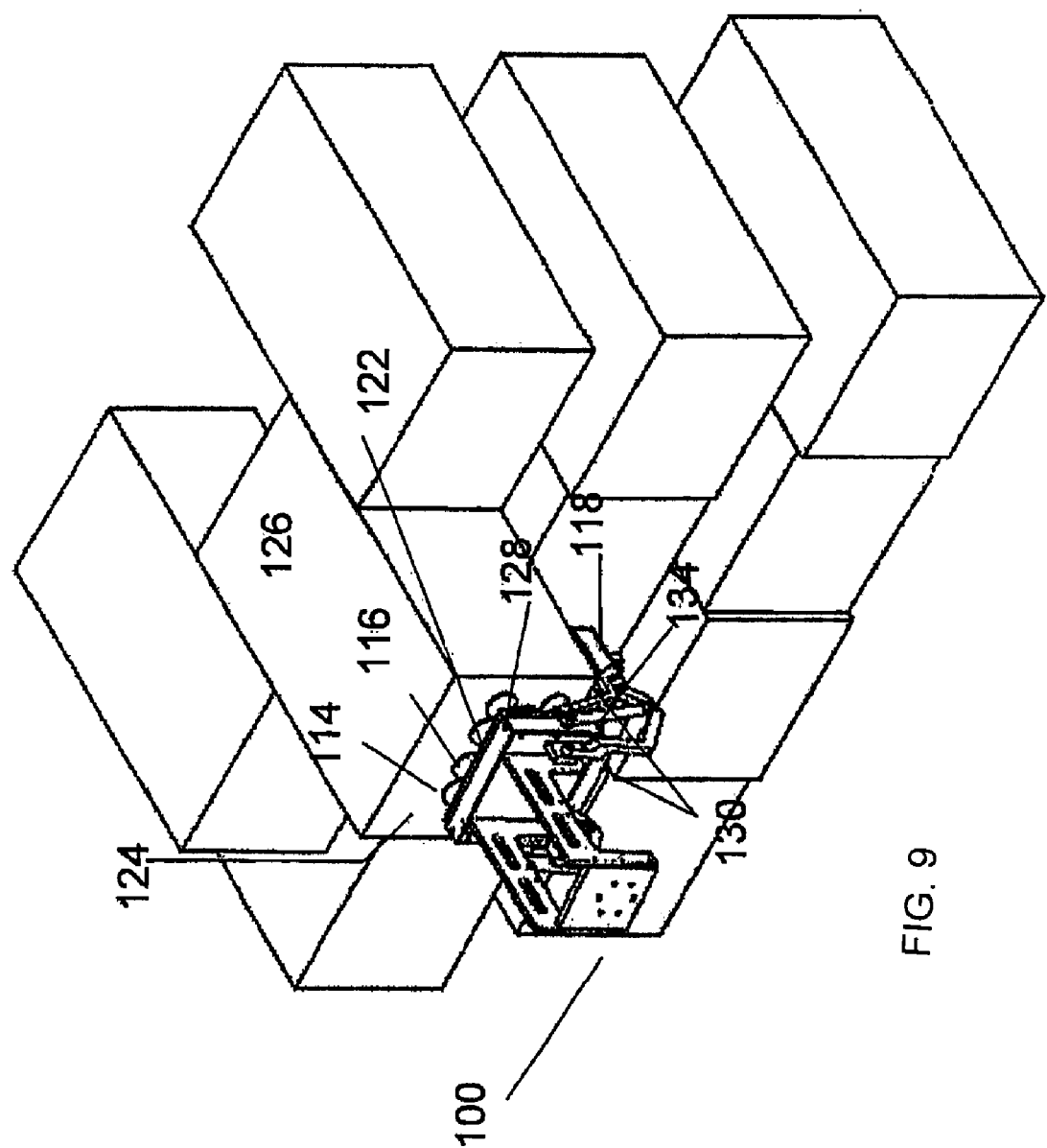
FIG. 9 is a perspective view of the gripper system of FIG. 6 in use during a fourth phase.

In FIGS. 9 and 10, the second suction cup gripper 118 has been moved so far out of its starting or resting position into the gripping position that it is now in contact with the bottom surface 138.

The gripper system 100 can be rotated by 180° in order to grip packages that are ceiling-high, that can be reached normally or that are on the floor. The pneumatic cylinders 134 and 136 generate only the force needed for repositioning the second suction cup gripper 118. In its gripping position, the gripper system 100 is self-reinforcing since a horizontal movement by the package to which suction has been applied is avoided and thus no vertical displacement is possible. If the gripper system 100 is rotated by 180° and opened, then the second suction cup gripper 118 is suspended in its position and remains there without any further exertion of energy. The drives and the direction-indicating elements are arranged on the side.

A package in a corridor can likewise be reached since, in the starting or resting position of the gripper system 100, the front surface of the smallest package is not exceeded.

The features of the invention disclosed in the present description, in the drawings and in the claims can be essential either individually or in any desired combination for the implementation of the invention in its various embodiments.

The invention claimed is:

1. A gripper system for stacked packaged goods, comprising:
    a first gripper unit for gripping a package by a front surface of the package;
    a second gripper unit for gripping the package by a second surface that is at a right angle to the front surface, the second gripper unit having a drive device associated therewith, the second gripper unit being adapted to be moved out of a starting position in which the second gripper unit and the drive device as seen from the gripping side of the first gripper unit, are arranged behind the first gripper unit, into a gripping position in which the first gripper unit is positioned for gripping the package by its front surface and the second gripper unit is positioned for gripping the package by its second surface; and
    wherein dimensions of a surface of the first gripper unit are selected to be smaller than dimensions of the front surface of the package, enabling pulling the package out of a wall of packages by means of the gripper system.

2. The gripper system recited in claim 1, wherein the second gripper unit and the drive device, as seen from the gripping side of the first gripper unit, are dimensioned and arranged behind the first gripper unit in such a way that they do not protrude laterally beyond the first gripper unit.

3. The gripper system recited in claim 1, wherein at least one of the first and second gripper units comprises a suction gripper.

4. The gripper system recited in claim 3, wherein the suction gripper comprises a suction cup gripper, a flat suction gripper, a bellows suction gripper or a surface suction gripper.

5. The gripper system recited in claim 1, wherein the second surface is a bottom or top surface of the package.

6. The gripper system recited in claim 1, wherein the second gripper unit is arranged at a right angle to the first gripper unit in the starting position.

7. The gripper system recited in claim 1, comprising a controller that is adapted to control the gripper system in such a way that the first gripper unit grips the front surface of the package and then the second gripper unit grips the second surface of the package.

8. The gripper system recited in claim 1, wherein the drive device comprises a swiveling or rotating device for swiveling or rotating the second gripper unit out of the starting or resting position into the gripping position.

9. The gripper system recited in claim 8, wherein the second gripper unit is adapted to be swiveled or rotated about a horizontal or vertical axis via the swiveling or rotating device.

10. The gripper system recited in claim 1, wherein the drive device comprises a parallel displacement device for displacing the second gripper unit in parallel out of the starting or resting position into the gripping position.

11. The gripper system recited in claim 10, wherein the parallel displacement device comprises two hinged column pairs adapted to be driven by a pneumatic cylinder.

12. The gripper system recited in claim 10, wherein the parallel displacement device comprises an elliptical guide and a linear drive.

13. The gripper system recited in claim 1, wherein the drive device comprises a folding device for folding the second gripper unit out of the starting position into the gripping position.

14. The gripper system recited in claim 13, wherein the second gripper unit is adapted to be folded about a horizontal or vertical axis via the folding device.

15. The gripper system recited in claim 1, comprising a drive device associated with the first gripper unit, wherein the first and second gripper units are adapted to be moved out of a starting or resting position in which the second gripper unit and the drive devices for the first and second gripper units, as seen from the gripping side of the first gripper unit, are arranged behind the first gripper unit in such a way that they do not protrude beyond the first gripper position into a gripping position in which the first gripper unit is positioned for gripping the package by the front surfaces and the second gripper unit is positioned for gripping the package by its second surface.

16. The gripper system recited in claim 15, wherein the first gripper unit is a first surface suction gripper, the second gripper unit is a second surface suction gripper, wherein the drive device for the first gripper unit comprises a first linear drive for horizontally moving the first surface suction gripper in the effective direction of the suction force of the first surface suction gripper and it comprises a second linear drive for vertically moving the first linear drive, and wherein the drive device for the second gripper unit comprises a third linear drive for horizontally moving the second surface suction gripper in the effective direction of the suction force of the first surface suction gripper, whereby the first and third linear drives are arranged in a vertical plane above or below each other.

17. The gripper system recited in claim 16, wherein at least one of the first, second or third linear drives comprises a guided cylinder.

18. The gripper system recited in claim 16, wherein at least one of the first, second or third linear drives comprises a linear drive without a piston rod.

19. The gripper system recited in claim 16, wherein at least one of the first, second or third linear drives can be operated pneumatically.

* * * * *

UNITED STATES PATENT AND TRADEMARK OFFICE
CERTIFICATE OF CORRECTION

| | | |
|---|---|---|
| PATENT NO. | : 8,162,362 B2 | Page 1 of 1 |
| APPLICATION NO. | : 12/300176 | |
| DATED | : April 24, 2012 | |
| INVENTOR(S) | : Braunschweiger | |

It is certified that error appears in the above-identified patent and that said Letters Patent is hereby corrected as shown below:

On the title page, Item [73] Assignee should read: Deutsche Post AG, Bonn (DE)

Signed and Sealed this
Sixteenth Day of September, 2014

Michelle K. Lee
*Deputy Director of the United States Patent and Trademark Office*